Patented Oct. 18, 1927.

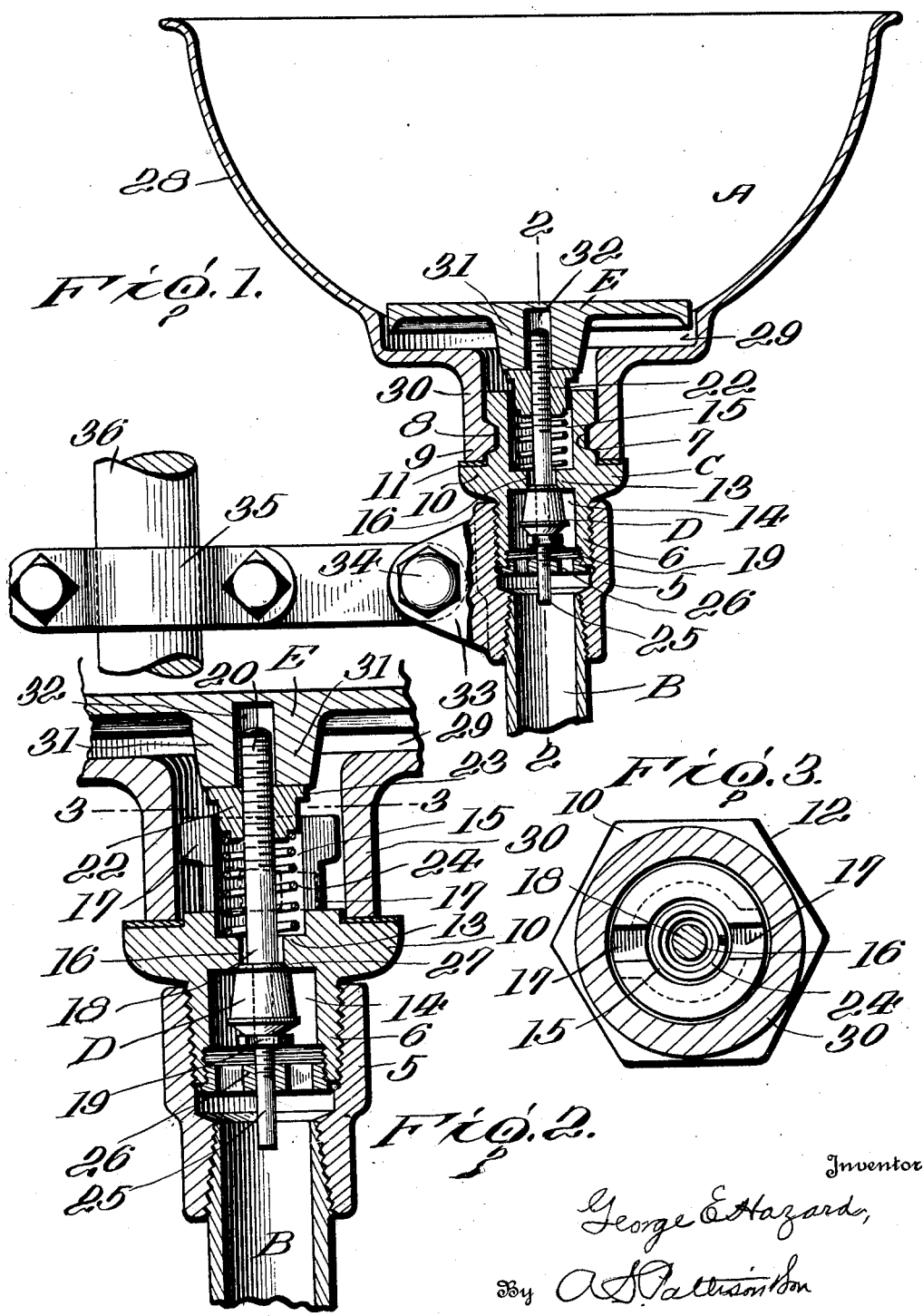

1,646,246

UNITED STATES PATENT OFFICE.

GEORGE EDGAR HAZARD, OF ROCHESTER, NEW YORK, ASSIGNOR TO EMPIRE MILKING MACHINE CO., INC., OF ROCHESTER, NEW YORK.

ANIMAL-WATERING DEVICE.

Application filed February 13, 1926. Serial No. 88,047.

This invention relates to improvements in animal watering devices, being more specifically directed to a device of this nature wherein there is provided a water bowl having therein a valve controlling member, which is adapted to be engaged by the animal drinking from the bowl.

The primary object of this invention is the provision of an animal watering device constructed in a manner whereby there is no place for the lodgment of germs or other undesirable foreign matter.

Another object of the invention is the provision of a device of the character described, which can be quickly and easily cleaned.

A still further object of the invention is to provide a device of the character described, wherein the valve may be quickly and readily removed for cleaning, adjustment or renewal.

A still further object of the invention is the provision of a device, which is simple of construction, cheap of manufacture and highly efficient in operation.

Other further objects, novel features of construction and improved results of the invention will appear from the following description and accompanying drawings.

In the drawings:

Figure 1 is a vertical sectional view of a watering device made in accordance with the invention.

Fig. 2 is a fragmentary vertical sectional view taken at right angles to the view in Fig. 1, the section being on the line 2—2 of Fig. 1.

Fig. 3 is a transverse sectional view, taken on the line 3—3 of Fig. 2.

Describing the invention in generic terms, it comprises a drinking bowl A, a water supply pipe B, a valve housing and plug C, a valve D, and a valve plate E.

Describing the invention in detail, it will be seen that the outlet end of the water supply pipe B is externally screw-threaded to receive an internally screw-threaded pipe fitting 5, in which the lower end 6 of the valve housing or plug C is threaded. The upper end of the valve housing C is provided with radial slots 7, to receive the lugs 8 on the inner face of the lower end 9 of the water bowl A, whereby a bayonet lock is effected between the water bowl and the valve housing. To assure a water-tight connection, the valve housing, intermediate its length, is provided with a circumferential shoulder 10, against which the lower end 9 of the water bowl is clamped, a gasket 11 being interposed between the bowl end and the housing shoulder. To enable the valve housing to be readily tightened into the pipe fitting 5, the shoulder is provided with flattened faces 12, adapted to be engaged by a suitable wrench.

The valve housing is provided internally, intermediate its length, with an inwardly extending flange or web 13, thereby dividing the plug into a lower valve chamber 14, and an upper spring chamber 15, the web being provided centrally with an opening 16. The upper end of the valve housing is provided with oppositely arranged vertical slots 17, which extend from the top of the housing to the radial grooves 7, which enables the placement of the bowl which is locked in place by rotation.

The valve D is preferably made of rubber, being mounted on the valve rod 18, and being held in position by the nut 19. The valve rod extends upwardly beyond the valve through the opening 16, and spring chamber 15 to a point well above the upper end of the valve housing or plug. The upper end of the valve stem is threaded, as at 20, to receive a nut 22, provided with an enlarged head 23.

Mounted within the spring chamber 15 is a suitable coiled spring 24, which surrounds the valve stem, and has its lower end in engagement with the interior web 13, and its upper end in engagement with the nut 22. The valve stem extends beneath the valve D and its lower end 25 slides through a suitable opening in the perforated nut 26, which is mounted in the lower end of the valve housing plug. It will be readily apparent that the nut 26 acts as a guide for the valve stem.

The lower end of the opening 16 in the valve housing web is tapered as at 27, to form a valve seat, and the valve D has its upper end tapered to co-operate with the seat and make a water-tight joint when in a closed position.

The drinking bowl is flared outwardly, as at 28, the bottom of the bowl being formed with a circular depression 29, adjacent the downwardly extending pipe-portion 30, on the lower end 9 of which are the lugs 8, above referred to.

The valve plate E is circular in form and of a size to fit loosely within the depression 29 of the bowl. On its under side, the plate is provided with a boss 31, having therein a central opening 32 of a diameter slightly larger than the diameter of the valve stem, whereby the plate fits over the upper end of the valve stem and is supported upon the spring retaining and tensioning nut 22. As is clearly shown in the drawings, the valve plate is supported sufficiently high above the bottom of the bowl depression 29 to permit a downward movement, which will effect an opening of the valve D. Normally the valve D is closed and the valve plate E held in an elevated position by reason of the coiled spring 24.

In the drawings, the pipe fitting 5 is shown provided with an outwardly struck lug 33, to which is fastened by a suitable bolt 34 a clamp 35, which is adapted for connection with a stanchion 36, or the like, for supporting the bowl.

In the event that the pipe B is sufficiently rigid the use of the clamp would not be necessary, which would eliminate the pipe fitting 5 and standard pipe-fittings can be substituted, or if desired, the pipe B could be of greater diameter and internally screw-threaded to engage directly with the externally screw-threaded lower end of the valve housing plug C.

It will be readily apparent that when the valve is opened by downward pressure on the valve plate, water will pass upwardly through the perforated nut 26, hole 16, through the spring housing and upwardly around the valve plate E into the bowl.

Attention is directed to the fact that there is no place for the lodgment of germs or foreign matter, which can not be quickly and easily reached for cleaning. The bowl itself is readily removed by a slight rotation, carrying with it the valve plate E. The valve housing and its parts can also be quickly and easily dismantled.

Should it be desired to stop the supply of water to any particular bowl, this is quickly and easily accomplished by turning down the nut 22 above the spring until the head of this nut engages the upper end of the valve housing, which will prevent the valve from being opened. It is found desirable at times, especially where a drinking bowl is provided in each stall of a stable, to shut off the supply of water to a particular bowl, because of sickness of the animal using the bowl.

By reason of the circular construction of the valve, any small chaff or litter falling into the bowl can usually be readily removed and will not pass beneath the plate. In the event that this foreign matter should pass the plate, it can be readily removed by detaching the bowl.

Having thus described my invention, what I claim and desire to secure by Letters Patent is:

1. An animal watering device comprising a tubular member having an upper spring containing chamber and a lower valve containing chamber, said chambers divided by an intermediate horizontal web having a water passage, a valve in the lower chamber adapted to control the flow of water through said passage, a valve stem passing through the said web portion to the lower end of which is attached the said valve, the said stem passing through the spring and carrying at its upper end means for engaging the upper end of the spring, a drinking trough having an upper open end and its lower end detachably connected with the wall of said upper chamber, and a floating valve plate loosely supported by the upper end of the said stem, the wall of the lower chamber connected with a water supply, said parts operating in the manner and for the purpose specified.

2. An animal watering device comprising a member having an upper spring containing chamber and a lower valve containing chamber separated by an intermediate web portion, said web portion having a water passageway, a valve adapted to close said passageway, a stem passing through the said web, the lower portion carrying the said valve, the upper end of the said stem portion having attached below to its upper portion an adjustable nut in engagement with the said spring, an open ended drinking bowl having its lower end detachably connected with the outer surface of the wall of said upper chamber, and a floating plate loosely supported by the said stem and the said nut portion within the lower end of the bowl, the wall of the lower chamber being connected with a water inlet, the parts adapted to operate in the manner described.

3. An animal watering device comprising a tubular member having its upper portion provided with a spring containing chamber and its lower portion with a valve containing chamber, said chambers being separated by a horizontal web and the web provided with a water passageway, the stem passing through the web portion and carrying at its lower end the said valve and the upper end of the stem projecting upwardly, an open ended drinking bowl having its lower end detachably connected with the wall of the upper chamber, the bowl portion having at its bottom a downwardly projecting recess, a floating plate supported by the said stem portion, said plate having a contour corresponding to the contour of the depression and loosely fitting within the depression for the purpose of preventing an accumulation of dirt at points therebelow, the said plate fitting loosely on the stem whereby it can be readily removed for cleaning purposes, and a water supply pipe connected to the wall of the said lower valve chamber for the purpose described.

In testimony whereof I hereunto affix my signature.

GEORGE EDGAR HAZARD.